United States Patent [19]
Gillard et al.

[11] Patent Number: 5,615,133
[45] Date of Patent: Mar. 25, 1997

[54] METHOD AND DEVICE FOR STORING TRANSACTION DATA

[75] Inventors: Patrick Gillard, Corbeil Essonnes; Pierre Gonzalez, Rueil-Malmaison, both of France

[73] Assignees: Socetec, Montreuil Cedex; Institut Francais du Petrole, Rueil-Malmaison, both of France

[21] Appl. No.: 352,629

[22] Filed: Dec. 9, 1994

[30] Foreign Application Priority Data

Dec. 10, 1993 [FR] France ................................. 93 14965

[51] Int. Cl.⁶ ................................................. G06F 17/60
[52] U.S. Cl. ....................... 364/550; 371/21.1; 395/201; 395/235; 364/464.23
[58] Field of Search ................................. 364/408, 401, 364/510, 465, 479, 405, 550, 464.01–464.04, 900, 554, 580, 246, 246.3, 264.5; 371/21.1; 395/441, 416, 481, 182.04

[56] References Cited

U.S. PATENT DOCUMENTS

| | | | |
|---|---|---|---|
| 3,765,567 | 10/1973 | Maiocco et al. | 222/30 |
| 4,566,106 | 1/1986 | Check, Jr. | 371/67 |
| 4,719,563 | 1/1988 | Kosuge et al. | 364/200 |
| 5,159,671 | 10/1992 | Iwami | 395/250 |
| 5,175,839 | 12/1992 | Ikeda et al. | 395/425 |
| 5,185,876 | 2/1993 | Nguyen et al. | 395/425 |
| 5,265,032 | 11/1993 | Patel | 364/509 |
| 5,377,342 | 12/1994 | Sakai et al. | 395/425 |
| 5,398,324 | 3/1995 | Matida et al. | 395/425 |
| 5,454,940 | 6/1995 | Ousborne | 364/140 |

FOREIGN PATENT DOCUMENTS 2642197 7/1990 France .
8911134 11/1989 WIPO .

*Primary Examiner*—Emanuel T. Voeltz
*Assistant Examiner*—Hien Vo
*Attorney, Agent, or Firm*—Antonelli, Terry, Stout & Kraus, LLP

[57] ABSTRACT

The transaction data are acquired, developed and stored by a processing device located in direct proximity to measuring instruments, which includes a control processor (H) and a storage module (S). The data are stored in a non-volatile and redundant media (3, 4) and under the control of a control element (5). Queries to be performed are transmitted thereto by control processor (H) by means of a transmission channel (L) and of a buffer memory (8). The data of these queries are written and read into the storage media via a memory (6). Permanent controls are performed to check the quality and the accuracy of all the internal transfers and also to save the data in case of a power supply problem. The data saved in the memory may be read by external request.

17 Claims, 2 Drawing Sheets

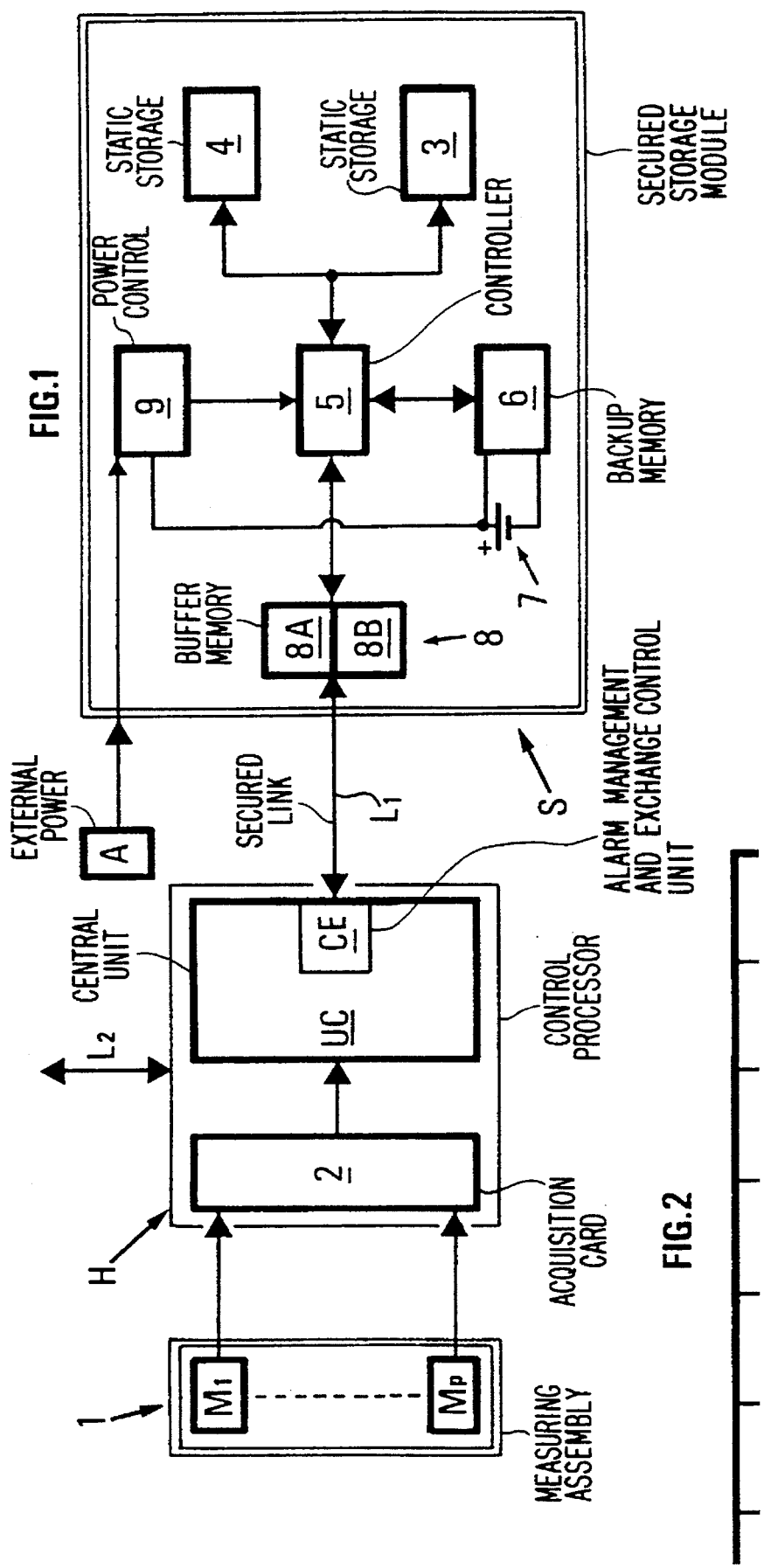

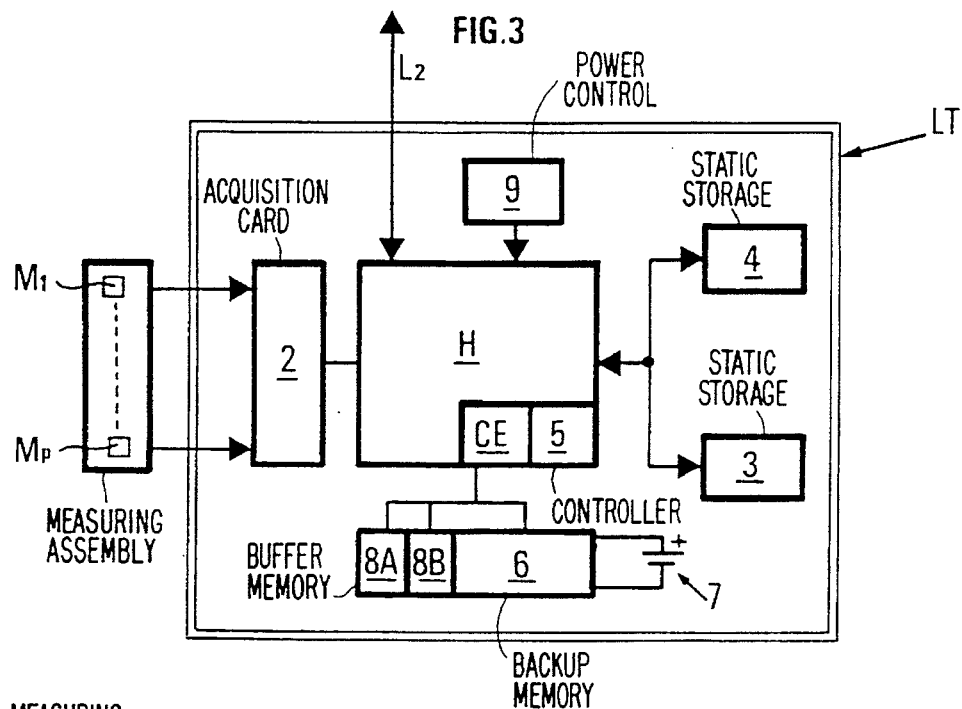
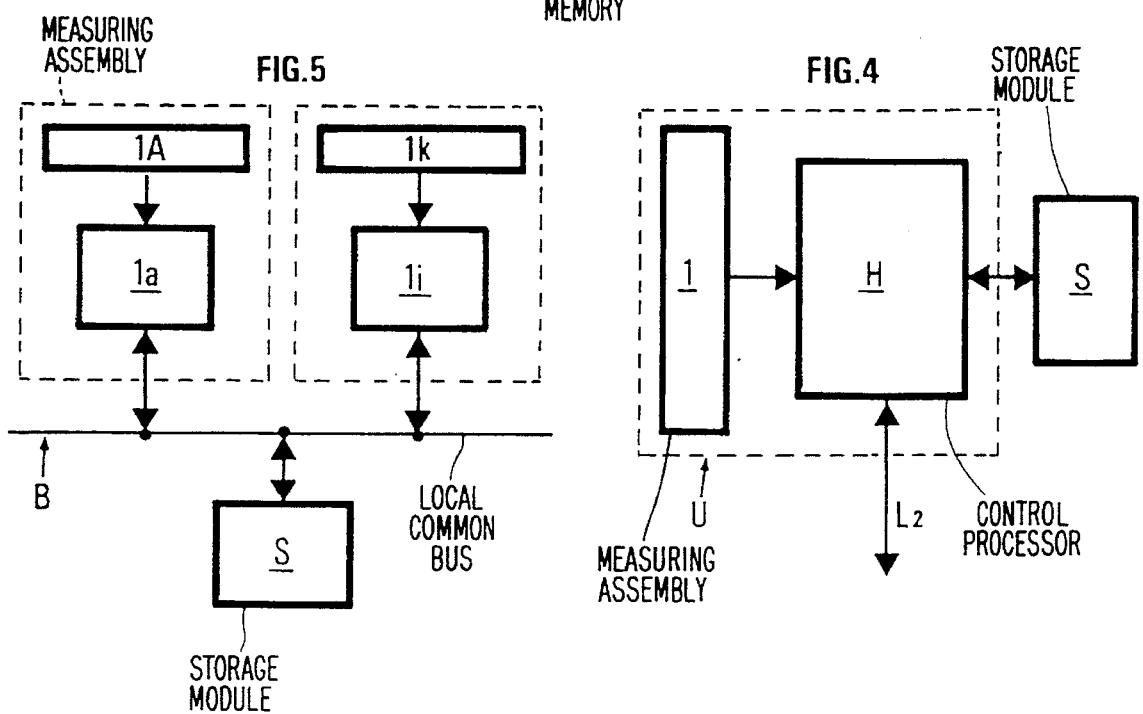

METHOD AND DEVICE FOR STORING TRANSACTION DATA

BACKGROUND OF THE INVENTION

1. Field of the Invention

The present invention relates to a method and a device for storing transaction data allowing the acquisition and the remote management thereof to be simplified, such as, for example, values measured by measuring devices associated with authorized local validation means.

The invention is notably applied to storing data of a transactional nature, in reference to measuring units, for example for measurements coming from volumetric counting equipments, weighing equipments, etc, in order to replace secured printers, and more generally for any equipment requiring high-reliability storage.

2. Description of the Prior Art

In service terminals such as hauling depots, warehouses, ports for example, where considerable amounts of liquids such as petroleum products for example are transferred on road vehicles, ships, etc, in order to be distributed, or in oil pipeline head stations for example, there are generally local assemblies for measuring and for displaying the amounts delivered. Such assemblies include counters or turbines, temperature detectors, quantity indicators and an electronic module possibly suited for performing scale and temperature corrections. The local electronic module is connected through transmission channels to a computing and management assembly in a remote control room where they are stored prior to being processed.

Since the indications from the measuring means (counters, turbines, etc) have to be accurate and incontestable, the local measuring assembly is generally associated with a local check control box whose manufacturer is registered by the authorities in charge.

Storage is currently performed on storage media such as magnetic disks or diskettes, or high-density non-volatile memories for example in form of PCMCIA/JEIDA standard cards (credit card format). These cards utilize either memories saved by an integrated battery, or "flash" type EEPROMs (memories requiring no backup power supply). The reliability of integrated-circuit memories is generally good. It is nevertheless not possible to totally rely on them and be sure that, in practice, the data storm actually correspond, on the one hand, to the data written and, on the other hand, to the data read.

In order that the guarantee of the accuracy of the measurements applies, a storage unit with a proven reliability is necessary in this control room. This unit, which generally includes a storage such as a secured printer or secured magnetic media, associated with a control computer such as a micro-computer, must be given an official acceptance and, to that end, be accessible to controls by official bodies.

SUMMARY OF THE INVENTION

The method according to the invention allows simplification of the acquisition and of the storage of transaction data developed from measurings performed by a measuring (and relative notably to the delivery of fluids in service terminals), while avoiding the drawbacks mentioned above.

The invention includes the secured local storage of the measurements through the local addition, to the measuring and validation devices, a processing device including a control processor and storage comprising several local storage units a control suited for managing, by order of the control processor, the storage of validated measurement values, and for controlling data exchanges between the various local storage units, so as to concentrate in a single place the whole of the devices necessary for the acquisition and the secured storage of transaction data.

The method may further include the remote transfer of the data secured and stored by order of the devices managing these transactions.

This secured storage of the transaction data preferably comprises duplication of these data by the storage, and control of the exchanges between the various local storage units.

The method comprises for example connecting the control processor to the control with the aid of a secured transmission channel.

The control may also be directly associated with the control processor.

The method according to the invention is advantageous in that it allows the area where measurement validation controls are normally performed to be limited, because the devices for storing the data and for guaranteeing they are preferably located directly in the place of installation of the measuring and validation devices used or in direct proximity thereto, for example in a single box accessible from the outside for reading stored transaction dam. On account of this layout, it is no longer necessary, as previously, to have an authorized storage unit in the place of computerized management of the service terminals.

A guarantee that the measurements acquired and stored locally are definitely in accordance with the original values measured is mainly obtained:

by a permanent duplication of the data to be kept;

by using a backup memory to store transfers in progress and also preferably a power supply control device; and by a set of controls to check that no transmission error occurs during each information transfer between the various storage units and the control processor.

The device according to the invention includes at least one local processing unit associated directly with the measuring devices and consisting of at least one control processor including devices for acquisition and validation of the data measured, at least one local module for storing the data developed, comprising several storage units arranged locally and associated with the measuring devices and a control arranged locally, suited for controlling, by order of the control processor, the storage of the validated measurement values, and for controlling data exchanges between the various storage units so that the values accessible from the outside of the processing unit during reading of the storage are in accordance with the values actually measured.

According to an embodiment, each storage module includes for example a first and a second storage unit (non-volatile static type memories for example), the control being suited for controlling the storage of validated measurement values in the first storage unit and for duplicating the values in the second storage unit, a backup memory for storing any transfer in progress between the control and the control processor, and a buffer memory for exchanges between the control processor and the storage module, the control being suited for controlling data exchanges between the various storage units.

According to an embodiment, the buffer memory includes for example a first area for writing queries coming from the control processor and execution reports coming from the control, and a second area for writing the data exchanged between the control processor and the control.

The device may also include testing devices means for testing if an external power supply and control are operational.

The second storage unit is for example a memory for duplicating data in the first storage unit, the control is suited for controlling the identity of the data validated in the two units.

The backup memory preferably comprises an area for data necessary for controlling the storage units.

According to an embodiment, the control is connected to the control processor by a secured link channel or incorporated therein. According to another embodiment, the device includes several control processors associated respectively with several measuring assemblies and sharing at least one storage assembly.

BRIEF DESCRIPTION OF THE DRAWINGS

Other features and advantages of the method and of the device according to the invention will be clear from reading the description hereafter of embodiments given by way of non limitative examples, with reference to the accompanying drawings in which:

FIG. 1 diagrammatically shows a first embodiment of the invention,

FIG. 2 diagrammatically shows a layout of each measurement storage unit in the invention, FIG. 3 shows another embodiment where the control is directly associated with a control processor;

FIG. 4 shows a second layout of the measurement units in form of autonomous measuring units; and FIG. 5 shows a variant of the previous embodiments, with local sharing of the storage between several control units.

DESCRIPTION OF THE PREFERRED EMBODIMENTS

A device according to the invention is associated (FIG. 1) with a measuring assembly 1 including one or several apparatuses M1 . . . Mp of a well-known type, grouped together. These may be counting devices : turbines, volumetric counters, etc, measuring volumes of liquid or solid products or substances which are the subject of transactions, temperature or pressure detectors, densimeters, viscosimeters, etc.

Since the measurings performed must be trustworthy, measuring apparatuses 1 are locally associated with a secured processing and storage unit to which the controls performed by the governmental services in charge of weights and measures check are applied.

The device according to the invention records and restores without errors, to an external system requesting it, values measured and stored following a series of controls in order to check the accuracy thereof.

It includes a secured storage module S connected by a secured link L1 to a control processor H. The processor includes an acquisition card 2 and a central unit UC programmed to develop scaled valid measurements from the analog or impulse signals coming from measuring apparatuses M1 to Mp.

The control processor also includes an alarm management and exchange control unit CE connected to line L1. The central unit may also be connected, by a transmission channel L2, to a remote transaction management room.

The secured storage module S includes two storage units 3, 4 of static type which require no backup power supply, simply referred to hereafter as "memories". The first unit (or main memory) 3 receives the measured values to be recorded. The second unit (or secondary memory) 4 is connected so as to duplicate, after control, the data fed into the first memory.

According to needs, the capacity of the storage units may be selected between 256 Kilobytes (Kb) and 64 Mb for example. The capacity of the second unit is preferably chosen greater than that of the first unit.

The two storage units 3,4 are controlled by a control apparatus 5 such as a microcomputer programmed to manage queries and to control the state of the device permanently, which is also referred to as controller hereafter.

The device further includes a backup storage unit 6 saved by a battery 7 (or saved memory), which is connected to controller 5. In this backup storage unit 6, controller 5 permanently transfers the last query addressed thereto and all the data necessary for managing the storage units.

The device also includes a buffer memory 8 connected to line L1. The control processor H is arranged locally. It may belong to the same assembly as device S for example and, in this case, one uses a transmission channel in parallel mode. It may also be physically separated from device S although it remains for example in the same local box and, in this case, a secured MODBUS type link is preferably used.

The buffer memory 8 includes a first area 8A through which pass the queries coming from control processor H and the execution reports which are sent in return to control unit 5, and a second area 8B for the data exchanged between control unit 5 and control processor H.

The device further includes an element 9 for controlling the power supply delivered by an external supply A. It has a dual purpose. In case of a drop of voltage, it may, by means of controller 5, block any possibility of new writing in storage units 3, 4, 6 and, besides, emit alarm signals which are then transmitted to control processor H. Element 9 also permanently checks that controller 5 is active.

The two storage units 3, 4 may both be irremovable but, if need be, it is also possible to use a removable main storage unit 3.

Operation

In normal operation, the device has four modes:
writing of a recording;
reading of a recording;
file reindexing;
medium change.

Writing mode

In these four modes, the device is assumed to be at rest under alarm, with a faultless sequence run. It should be noted that the word "semaphore" used hereafter refers to a functional signal indicating at any time the type of operation requested, in the process of being run or completed.

The following semaphores may be activated or deactivated in buffer memory 8 either by the control processor H, or by controller 5.

| BY CONTROL PROCESSOR H | BY CONTROLLER 5 |
| --- | --- |
| Query writing | Execution in progress |
| Writing query | Execution completed |
| Reading query | Execution report |
| Reindexing query | Controller alarm |
| Formatting query | |

Control processor H positions, in the query area 8A of buffer memory 8, the "query writing" semaphore and the record of the data associated with this query in the given area 8B. When these data are in place in area 8B, the "writing query" semaphore is positioned by the control processor, the "query writing" semaphore is deactivated and control processor H remains waiting for an error free execution completed signal from the device.

When the "writing query" semaphore is detected, controller 5 positions, in buffer memory 8, the "execution in progress" semaphore and transfers the previous data from area 8B to the backup storage unit 6. It checks for error free execution of this transfer by performing a checksum, then by comparing the result thereof to that appearing in area 8B. In case of equality, controller 5 compares the data of area 8B and those in the backup memory 6 one by one.

If the previous control is satisfactory, controller 5 checks the presence and the conformity of the two storage units 3, 4, then it extracts from the backup memory 6, for each one of them, the physical pointer (this term refers to the current serial number of a record) and the virtual or effective pointer (this term refers to the serial number of a record effectively validated). The difference between a physical pointer and the corresponding virtual pointer is the number of records written with error(s) and inhibited.

From the values of these pointers, controller 5 commands writing on secondary memory 4 and on main memory 3, then it rereads each of the records and compares them to that transferred to backup memory 6. If the controls are satisfactory, the pointer indications are updated and stored in backup memory 6. Controller 5 positions, in the area 8A of buffer memory 8, a number V representing an execution report of the "execution completed" semaphore (V=1 if the control is positive) and it removes or disactivates the "execution in progress" semaphore.

Reading mode

The control processor H positions, in the area 8A of buffer memory 8, a "query writing" semaphore and, in data area 8B, a search criterion for certain measurements requested as well as the position thereof in a record. When the data corresponding to the search criterion are transferred to area 8B, the "reading query" semaphore is positioned and the "query writing" semaphore is removed. System H remains waiting for a completion signal from the device.

When controller 5 detects the "writing query" semaphore, it positions, in the query area 8A of buffer memory 8, the "execution in progress" semaphore and transfers the data from area 8A into the saved memory 6.

In order to test the transfer, it compares one by one the data recorded in area 8A with those recorded in backup memory 6. If the test is satisfactory, controller 5 checks the presence and the conformity of the records in the two storage units 3, 4, then it controls and initializes search pointers designating the first one of them in these two units.

From these pointers, controller 5 searches, in the first record, the selection criterion designated in the place provided. If there is no coincidence (if it does not find it in the same place), the pointer is incremented until the validated corresponding record where this criterion may be recovered is found.

This search is performed by comparing the search pointers and the physical pointers of the last record located in backup memory 6.

When the corresponding record has been found in the two storage units, it is transferred into backup memory 6. After reading, the controller 5 compares the record in main memory 3 and that in backup memory 6. If the control is satisfactory, the record is transferred into the data area 8B of buffer memory 8, then again compared with that of the backup memory 6 in order to check the quality of the transfer achieved. When the control is satisfactory, controller 5 positions, in the area 8A assigned to queries in buffer memory 8, the appropriate number V accounting for the execution (V=1 in the favorable case), as well as the "execution completed" semaphore and it removes the "execution under progress" semaphore.

Recorded files reindexing mode

This operation allows the file to be managed in "rotation" mode, i.e. the new records take physically the place of the older ones, the storage units 3, 4 are generally of the type where the data deletion is performed by blocks $B_1 \ldots B_n$ whose length depends on that of the whole medium, one of the blocks $B_0$ being allotted to a control software block called "system".

In this case, if a file block is deleted ($B_i$ for example in FIG. 2), the file is re-indexed. The file beginning pointers are positioned on the first records of the next block ($B_i+1$) and the file end pointers on the beginning of the first block previously deleted, assigned to the file.

Control processor H positions, in the query area 8A of buffer memory 8, the "query writing" semaphore, the "re-indexing" semaphore is positioned and the "query writing" semaphore is removed. When controller 5 detects the activation of the "re-indexing" semaphore, it positions, in buffer memory 8, an "execution in progress" semaphore and deletes the first block $B_i$ of each of the two storage units 3,4, then it reorganizes, as described previously, the corresponding pointers in backup memory 6. The controller positions thereafter, in the query area 8A of buffer memory 8, the number V accounting for the execution (V=1 in the favourable case), the "execution completed" semaphore and disactivates the "execution in progress" semaphore.

Medium change

This operation consists of a complete re-initialization of the storage. It is subjected to no control in the version when a permanent main storage medium 3 is used. On the other hand, in the version where the main storage medium 3 is removable, the device checks that it is empty.

Control processor H positions, in the query area 8A of memory 8, the "query writing" semaphore and, in the data area 8B of this memory, the information necessary for identification and controls such as:

date and time;

host identification;

name of the records file; and medium capacity.

When these data are transferred, the "formatting" semaphore is activated and the "query writing" semaphore is disactivated.

When controller 5 detects the formatting activation, it positions, in buffer memory 8, the "execution in progress" semaphore, it transfers the data from the area 8B of this memory into the backup memory 6 and it compares one by one the data of the buffer memory 8 with those of the backup memory 6, in order to check the good execution of the transfer. If the control is satisfactory, controller 5 checks that the two storage units 3, 4 are actually present, that their capacity is compatible with the medium capacity specified in the query, and that the main unit is really empty in case it is removable.

This set of data allows controller 5 to check permanently the conformity of the two storage units 3, 4 with respect to one another, and the dependence thereof on it. It initializes then the physical and virtual pointers of each storage unit 3, 4 and enters them into backup memory 6, then it enters, in the query area 8A of buffer memory 8, the value V characterizing the execution (V=1 as previously if satisfactory), the "execution completed" semaphore and finally disactivates the "execution in progress" semaphore.

Defects

Any mismatch or defect detected by controller 5 during execution or during the controls it performs permanently (checksum of the backup memory 6, state of the battery backup, etc) is signalled to control processor H. If it is a defect that is detected during the execution of a query, control processor H is made aware of it by access to the execution report in buffer memory 8 as soon as the "execution completed" semaphore is activated.

If the defect is detected by a permanent internal check, control processor H is also made aware thereof by the execution report, but in this case through the detection of the activation state of the "controller alarm" semaphore.

Execution report

It is always the value V of the last report that is recorded in the area 8A of buffer memory 8. This value is zeroed at the beginning of each new query of control processor H. As stated before, a favorable report is translated by a positive value V which is not equal to zero (V=1 for example). Other values are assigned to particular situations which are not considered as defective (V=2 in reading for example that everything is correct but that the record searched does not exist). Symbol V is assigned a negative value in case of a defect. The values −1, −2, etc (FF, FE, etc, in hexadecimal notation) are associated with defects in queries ("execution completed" semaphore), the values −127, −126, etc (80, 81 in hexadecimal notation) stand for defects internal to controller 5 ("controller alarm" semaphore).

Validated records/inhibited record

If controller 5 detects, after a writing query emitted by the control processor, a mismatch between the record in the backup memory 6 and the corresponding one in storage unit 3 and/or 4, it inhibits this record and a new attempt is made. After three unsuccessful attempts, controller 5 delivers a "medium writing defect" execution report. The report relative to the records inhibited for each medium is constantly updated in backup memory 6 for examination during maintenance operations.

According to the variant of FIG. 3, controller 5 is contained in control processor H. Memories 6 and 8 are arranged for example on the same storage medium. The assembly LT consisting of control processor H, the various memories of the local module S and acquisition element 2 is arranged in a single place (a technical room for example) and it is connected to each measuring assembly 1. In this case, controller 5 directly communicates with the static storage means 3, 4 on the one hand, and 6, 8 on the other hand, of assembly S by element CE.

This embodiment is particularly well suited if a powerful enough processor is available to perform all the functions allotted to control processor H and to storage module S, and described previously. In such a case, the previous exchanges (queries and reports) between elements H and S are replaced by exchanges between tasks performed by the single processor.

According to the embodiment of FIG. 4, a control processor H is associated with each measuring assembly 1 so as to form autonomous management measuring units U. A particular secured storage module S is associated with each unit formed thereby.

It is also possible, as illustrated in FIG. 5 to store, on a common storage module S, all the data acquired in parallel by several ones of these units U1 ... Uk by means of a local common bus B.

The device according to the invention has been described in an application intended for service terminals for road vehicles, ships, oil pipelines, etc. However, without departing from the scope of the invention, the device and its secured storage may be incorporated in the fuel pumps of service stations, so as to make them autonomous and capable of retaining and of retrieving on request all the successive distribution data.

We claim:

1. A device for reliably securing transaction data provided by a measuring assembly comprising:

a central unit including a programmed control for managing writing of data, reading of queries and control of the device;

a control processor associated with an acquisition device and an alarm management and exchange control unit;

a secured storage assembly linked to the central unit and including a first static storage for receiving transaction data provided by the measuring assembly to be recorded, a second static storage for recording transaction data which is a duplicate of the transaction data stored in the first static storage, a backup storage, connected to the programmed control, for permanently storing a last query addressed thereto from the programmed control and data required for management of the storages and a buffer memory, connected between the programmed control and the control processor; and wherein the control processor is programmed to permanently record duplicate data in the first and second static storages, to check any data transfer occurring between the storages and the buffer memory and to provide the transaction data in the backup memory with digital words used to verify that finally stored data in the backup storage is correct.

2. A device in accordance with claim 1 wherein the buffer memory comprises:

a first area for writing the queries received from the programmed control and reports from the programmed control and a second area for writing of data exchanged between the programmed control and the control processor.

3. A device in accordance with claim 1 further comprising:

an external power source; and a testing device for determining if the external power supply and the programmed control are operating properly.

4. A device in accordance with claim 2 further comprising:

an external power source; and a testing device for determining if the external power supply and the programmed control are operating properly.

5. A device in accordance with claim 1 wherein:

the programmed control and the control processor are disposed in a single box and are connected together with a secured channel link.

6. A device in accordance with claim 2 wherein:

the programmed control and the control processor are disposed in a single box and are connected together with a secured channel link.

7. A device in accordance with claim 1 wherein:

the programmed control is contained within the control processor.

8. A device in accordance with claim 2 wherein:

the programmed control is contained within the control processor.

9. A device in accordance with claim 1 wherein:

the control processor is disposed in proximity to the secured storage assembly and connected thereto by a parallel transmission channel.

10. A device in accordance with claim 2 wherein:

the control processor is disposed in proximity to the secured storage assembly and connected thereto by a parallel transmission channel.

11. A device in accordance with claim 1 further comprising:

a plurality of control processors each associated respectively with a different measuring assembly; and wherein the secured storage is coupled to the plurality of control processors.

12. A device in accordance with claim 2 further comprising:

a plurality of control processors each associated respectively with a different measuring assembly; and wherein the secured storage is coupled to the plurality of control processors.

13. A device in accordance with claim 1 wherein the programmed control comprises:

a microcomputer performing all functions of the control processor, the programmed control and the secured storage and including managing all exchanges of transaction data.

14. A device in accordance with claim 2 wherein the programmed control comprises:

a microcomputer performing all functions of the control processor, the programmed control and the secured storage and including managing all exchanges of transaction data.

15. A method for operating a device for reliably securing transaction data provided by a measuring assembly having a central unit including a programmed control for managing writing of data, reading of queries and control of the device, a control processor associated with an acquisition device and an alarm management and exchange control unit, a secured storage assembly linked to the central unit and including a first static storage for receiving transaction data provided by the measuring assembly to be recorded, a second static storage for recording transaction data which is a duplicate of the transaction data stored in the first static storage and a backup storage, connected to the programmed control, for permanently storing a last query addressed thereto from the programmed control and data required for management of the storages and a buffer memory, connected between the programmed control of the control processor comprising:

permanently duplicating transaction data in the first and second static storages;

checking for an identity of all transaction data in the storages; and validating transaction data stored in the storages only after an identify of the stored data has been detected.

16. A device as claimed in claim 1 wherein:

the control processor is programmed for a writing process to control a first transfer of data received from the measuring assembly from the buffer memory to the backup storage and to check the first transfer and to control a second transfer of data from the backup unit to the first static storage and to the second static storage and to check the second transfer by comparing data reread from the first and the second static storages corresponding to data from the backup unit.

17. A device as claimed in claim 1 wherein:

the control processor is programmed for a reading process to retrieve identical data from the first and from the second static storages and to transfer retrieved data in the backup unit to compare the retrieved data in the first static storage and corresponding data in the backup unit and to transfer after checking data transferred in the backup unit to the buffer memory.

* * * * *